(12) United States Patent
Kemmochi et al.

(10) Patent No.: US 10,536,306 B2
(45) Date of Patent: Jan. 14, 2020

(54) GROUND SHORT CIRCUIT PORTION DETECTING APPARATUS, GROUND SHORT CIRCUIT PORTION DETECTING METHOD, AND COMPUTER-READABLE RECORDING MEDIUM

(71) Applicants: Takuya Kemmochi, Kanagawa (JP); Junichi Shimoda, Tokyo (JP); Kazushi Takei, Kanagawa (JP); Tomohide Kondoh, Kanagawa (JP); Tetsuya Hara, Tokyo (JP)

(72) Inventors: Takuya Kemmochi, Kanagawa (JP); Junichi Shimoda, Tokyo (JP); Kazushi Takei, Kanagawa (JP); Tomohide Kondoh, Kanagawa (JP); Tetsuya Hara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 183 days.

(21) Appl. No.: 15/887,931

(22) Filed: Feb. 2, 2018

(65) Prior Publication Data
US 2018/0227150 A1 Aug. 9, 2018

(30) Foreign Application Priority Data
Feb. 6, 2017 (JP) .................................. 2017-019256

(51) Int. Cl.
*G06F 11/00* (2006.01)
*H04L 25/08* (2006.01)
(Continued)

(52) U.S. Cl.
CPC .............. *H04L 25/08* (2013.01); *G06F 12/16* (2013.01); *H04L 12/40* (2013.01)

(58) Field of Classification Search
CPC ....................................................... H04L 25/08
(Continued)

(56) References Cited

U.S. PATENT DOCUMENTS 4,825,438 A * 4/1989 Bennett ............... G06F 11/0751
710/100
5,384,697 A * 1/1995 Pascucci ................. G06F 9/465
700/10

(Continued)

FOREIGN PATENT DOCUMENTS

JP 2005-221685 8/2005
JP 2007-235870 9/2007
(Continued)

*Primary Examiner* — Dieu Minh T Le
(74) *Attorney, Agent, or Firm* — Duft & Bornsen, PC

(57) ABSTRACT

Switch units control ON and OFF of communication between a master device and slave devices. Signal levels of communication lines between switch units and slave devices are maintained at a predetermined level. A switch unit in a first stage is turned on and off by a first switch control signal. A switch unit in a second stage is turned on and off by a switch control signal generated based on a level of a communication line in the first stage and the first switch control signal. A switch unit in each of subsequent stages is turned on and off by a switch control signal generated based on a level of a communication line in a preceding stage and a switch control signal in a second preceding stage. A portion of ground short circuit is identified based on states of communication between the master device and the slave devices.

6 Claims, 7 Drawing Sheets

(51) Int. Cl.
 *G06F 12/16* (2006.01)
 *H04L 12/40* (2006.01)
(58) Field of Classification Search
 USPC ............................. 714/4.5, 5.1, 43, 44, 56
 See application file for complete search history.

(56) References Cited

U.S. PATENT DOCUMENTS

| | | | | |
|---|---|---|---|---|
| 6,198,642 | B1* | 3/2001 | Kociecki | H02M 1/4225 |
| | | | | 307/150 |
| 2014/0211345 | A1* | 7/2014 | Thompson | B60L 53/68 |
| | | | | 361/42 |
| 2015/0270727 | A1* | 9/2015 | Fukute | B60L 3/0046 |
| | | | | 320/107 |

FOREIGN PATENT DOCUMENTS

| | | |
|---|---|---|
| JP | 2016-015070 | 1/2016 |
| JP | 2016-076159 | 5/2016 |
| JP | 2018-018207 A | 2/2018 |

* cited by examiner

FIG.5

| RECHECK OF GROUND SHORT CIRCUIT IN FIRST COMMUNICATION LINE | COMMUNICATION WITH FIRST SLAVE DEVICE | COMMUNICATION WITH SECOND SLAVE DEVICE | COMMUNICATION WITH THIRD SLAVE DEVICE | COMMUNICATION WITH FOURTH SLAVE DEVICE | DETERMINATION OF FAULT PORTION |
|---|---|---|---|---|---|
| DETECT GROUND SHORT CIRCUIT | - | - | - | - | FIRST COMMUNICATION LINE |
| RESOLVED | NO RESPONSE | RESPONDED | RESPONDED | RESPONDED | SECOND COMMUNICATION LINE OR FIRST SLAVE DEVICE |
| RESOLVED | NO RESPONSE | NO RESPONSE | RESPONDED | RESPONDED | THIRD COMMUNICATION LINE OR SECOND SLAVE DEVICE |
| RESOLVED | NO RESPONSE | NO RESPONSE | NO RESPONSE | RESPONDED | FOURTH COMMUNICATION LINE OR THIRD SLAVE DEVICE |
| RESOLVED | NO RESPONSE | NO RESPONSE | NO RESPONSE | NO RESPONSE | FIFTH COMMUNICATION LINE OR FOURTH SLAVE DEVICE |

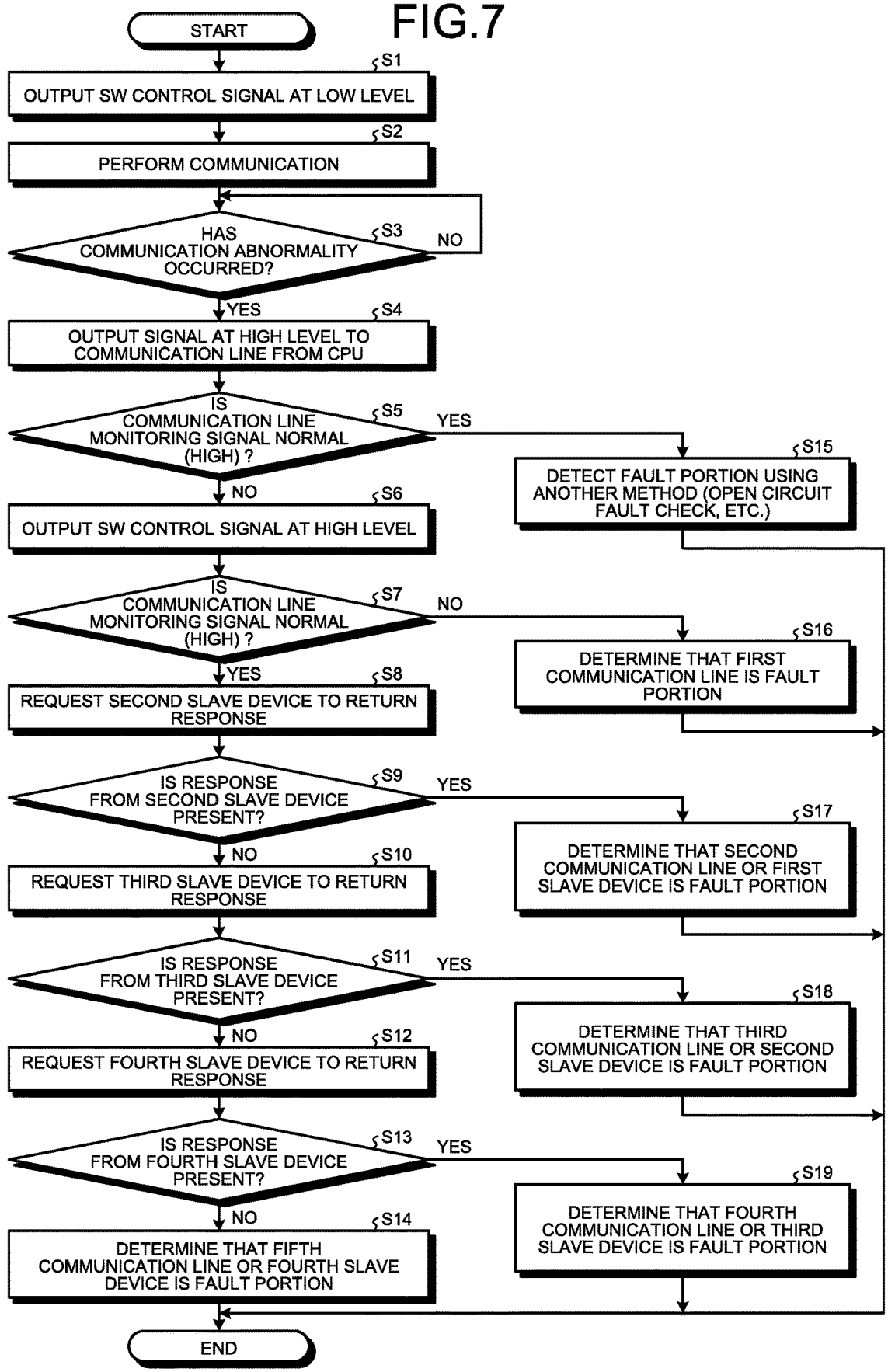

GROUND SHORT CIRCUIT PORTION DETECTING APPARATUS, GROUND SHORT CIRCUIT PORTION DETECTING METHOD, AND COMPUTER-READABLE RECORDING MEDIUM

CROSS-REFERENCE TO RELATED APPLICATIONS

The present application claims priority under 35 U.S.C. § 119 to Japanese Patent Application No. 2017-019256, filed on Feb. 6, 2017. The contents of which are incorporated herein by reference in their entirety.

BACKGROUND OF THE INVENTION

1. Field of the Invention

The present invention relates to a ground short circuit portion detecting apparatus, a ground short circuit portion detecting method, and a computer-readable recording medium.

2. Description of the Related Art

In recent years, a bus communication system with a multi-slave configuration, in which a plurality of slave devices are connected to a master device, has been known. In the bus communication system with the multi-slave configuration as mentioned above, a so-called ground short circuit fault, in which a voltage level of a signal line reaches a ground level, sometimes occurs. In the ground short circuit fault, it is difficult to identify a fault portion as compared to an open circuit fault.

Japanese Patent Application Laid-open No. 2007-235870 discloses a bus communication system capable of identifying a ground short circuit fault portion. In the disclosed bus communication system, a disconnection switch is provided between a master device and each of slave devices that are connected by daisy-chain connection. Then, in a state where the master device and all of the slave devices are disconnected by the disconnection switches, the master device and each of the slave devices are connected one by one to check availability of normal communication in order to identify a portion in which ground short circuit occurs.

However, in the bus communication system disclosed in Japanese Patent Application Laid-open No. 2007-235870, it is necessary to control ON and OFF of each of the disconnection switches using a control signal output from the master device. To realize this configuration, central processing units (CPUs) for the respective slave devices are mounted on the master device. Then, each of the CPUs controls ON and OFF of each of the disconnection switches to check availability of normal communication with each of the slave devices. In this case, it is necessary to provide the CPU for each of the slave devices.

Furthermore, when a single CPU controls ON and OFF of each of the disconnection switches, it is necessary to mount a large number of pins on a control substrate or the like in order to supply a control signal to each of the disconnection switches. In this case, configurations, such as a circuit design, a mounting area, or a mounting location, around the CPU may be largely restricted.

SUMMARY OF THE INVENTION

According to one aspect of the present invention, a ground short circuit portion detecting apparatus is of a bus communication system in which a master device and a plurality of slave devices in a plurality of stages are connected. The ground short circuit portion detecting apparatus includes a plurality of switch units, a plurality of level maintaining units, a plurality of generating units. The plurality of switch units are each arranged between the master device and a slave device in a stage, and configured to control ON and OFF of communication between the master device and the slave device. The plurality of level maintaining units are each arranged between a switch unit and a slave device, and configured to maintain a signal level of a communication line between the switch unit and the slave device at a predetermined level. The plurality of generating units are each arranged in a stage, and configured to generate a switch control signal for turning on and off a switch unit in the stage. A switch unit in a first stage is turned on and off by a switch control signal output from the master device. A switch unit in a second stage is turned on and off by a switch control signal generated by a generating unit in the second stage based on a level of a signal output from a level maintaining unit in the first stage and a level of the switch control signal output from the master device. A switch unit in each of third and subsequent stages is turned on and off by a switch control signal generated by a generating unit in a preceding stage based on a level of a signal output from a level maintaining unit in a preceding stage and a level of a switch control signal generated by a generating unit in a second preceding stage. The master device is configured to identify a portion in which ground short circuit occurs, based on states of communication with the plurality of slave devices, the states of communication being changed depending on at least ON/OFF states of the plurality of switch units.

BRIEF DESCRIPTION OF THE DRAWINGS

FIG. 5 is a diagram for explaining an operation of determining a ground short circuit portion in the bus communication system according to the embodiment;

FIG. 7 is a flowchart illustrating the flow of an operation of determining a ground short circuit portion in the bus communication system according to the embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
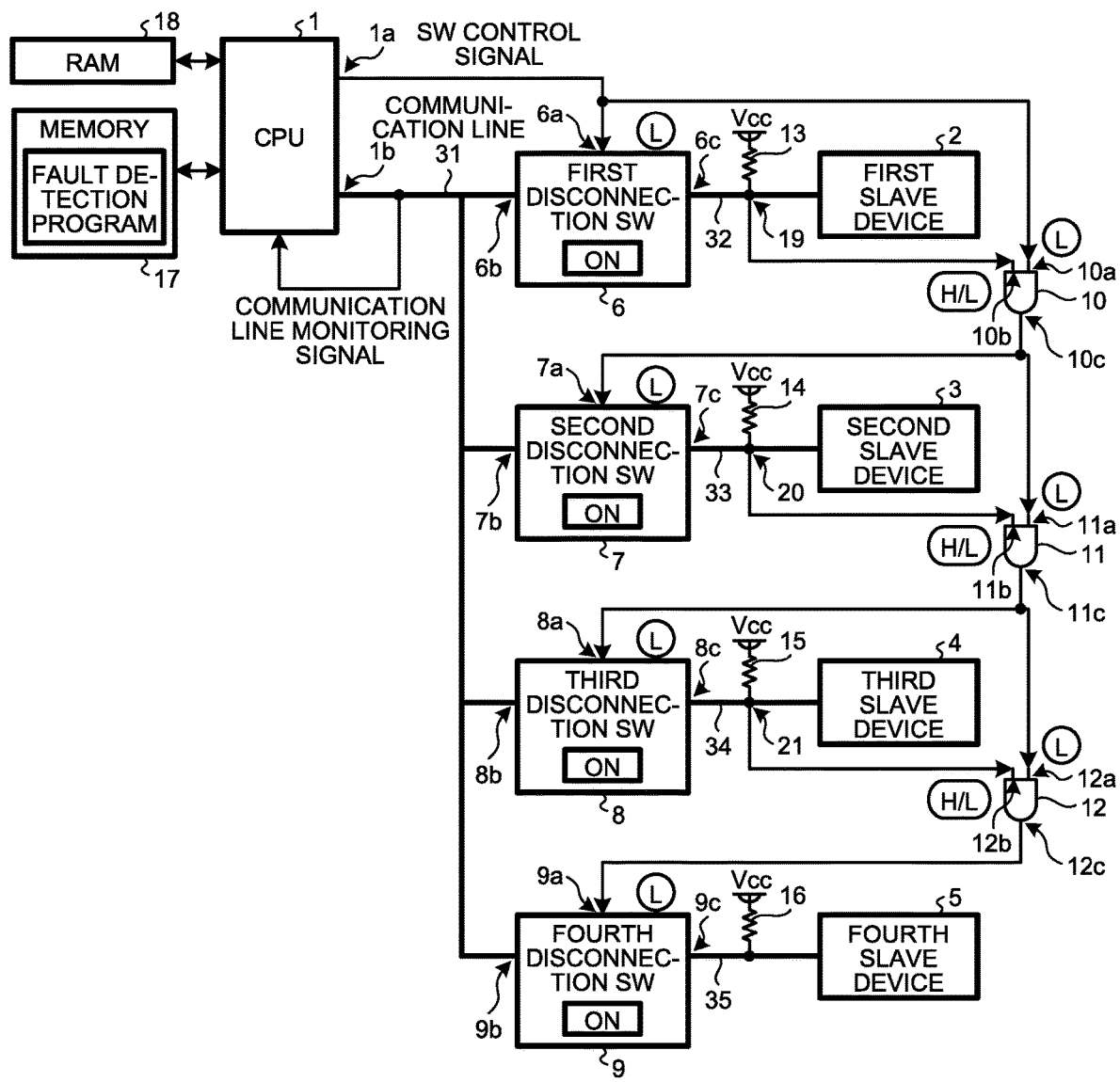
FIG. 1 is a block diagram of a bus communication system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of the invention is to provide a ground short circuit portion detecting apparatus, a ground short circuit portion detecting method, and a computer-readable recording medium capable of detecting, with a simple configuration, a portion in which ground short circuit occurs in a bus communication system with a multi-slave configuration.

Configuration of a Bus Communication System According to an Embodiment

FIG. 1 is a block diagram of a bus communication system according to an embodiment. As illustrated in FIG. 1, the bus communication system includes a CPU 1 as one example of a master device, and a plurality of slave devices 2 to 5 that are connected in parallel to the CPU 1. In FIG. 1, a case is illustrated in which the first to the fourth slave devices 2 to 5, i.e., a total of four slave devices, are connected to the CPU 1, as one example. The number of storage devices connected to the CPU 1 can be arbitrary. Furthermore, each of the slave devices 2 to 5 may be connected in series to the CPU 1.

The bus communication system according to the embodiment further includes first to fourth disconnection switches (first to fourth disconnection SWs: one example of a switch unit) 6 to 9 that are interposed and connected between the CPU 1 and the respective slave devices 2 to 5. The bus communication system according to the embodiment still further includes AND gates 10 to 12 (one example of a generating unit) for transferring a switch control signal (SW control signal) supplied to the first disconnection SW 6 to the second to the fourth disconnection SWs 7 to 9 in the subsequent stages. The bus communication system according to the embodiment still further includes pull-up registers 13 to 16 (one example of a level maintaining unit) for controlling outputs of the AND gates 10 to 12.

The bus communication system according to the embodiment still further includes a memory 17 and a random access memory (RAM) 18. In the memory 17, a fault detection program (one example of a ground short circuit portion detection program) for detecting a ground short circuit portion is stored. As will be described later, the CPU 1 loads each of functions of the fault detection program onto the RAM 18 and executes the functions to thereby detect a ground short circuit portion.

Details of a Connection Relationship Between the Components

The connection relationship between the above-described components will be described below. A first output terminal 1a of the CPU 1 for outputting a SW control signal is connected to a first input terminal 6a of the first disconnection SW 6 and one input terminal 10a of the first AND gate 10. A second output terminal 1b of the CPU 1 for outputting a communication signal is connected to each of second input terminals 6b, 7b, 8b, and 9b of the first to the fourth disconnection SWs 6 to 9 via a first communication line 31. The first communication line 31 is connected to an input terminal 1c of the CPU 1. The CPU 1 acquires, via the input terminal 1c, a communication signal that is output via the first communication line 31, and monitors a state of the currently output communication signal, or the like.

An output terminal 6c of the first disconnection SW 6 is connected to the first slave device 2 via a second communication line 32. One end of the pull-up register 13 described above is connected to a constant-voltage source Vcc and the other end thereof is connected to the second communication line 32. A connection point 19 between the other end of the pull-up register 13 and the second communication line 32 is connected to another input terminal 10b of the first AND gate 10.

An output terminal 10c of the first AND gate 10 is connected to a first input terminal 7a of the second disconnection SW 7 and one input terminal 11a of the second AND gate 11a. The second disconnection SW 7 is connected to the second slave device 3 via a third communication line 33. One end of the pull-up register 14 described above is connected to a constant-voltage source Vcc and the other end thereof is connected to the third communication line 33. A connection point 20 between the other end of the pull-up register 14 and the third communication line 33 is connected to another input terminal 11b of the second AND gate 11.

An output terminal 11c of the second AND gate 11 is connected to a first input terminal 8a of the third disconnection SW 8 and one input terminal 12a of the third AND gate 12a. The third disconnection SW 8 is connected to the third slave device 4 via a fourth communication line 34. One end of the pull-up register 15 described above is connected to a constant-voltage source Vcc and the other end thereof is connected to the fourth communication line 34. A connection point 21 between the other end of the pull-up register 15 and the fourth communication line 34 is connected to another input terminal 12b of the third AND gate 12.

An output terminal 12c of the third AND gate 12 is connected to a first input terminal 9a of the fourth disconnection SW 9. The fourth disconnection SW 9 is connected to the fourth slave device 5 via a fifth communication line 35. One end of the pull-up register 16 described above is connected to a constant-voltage source Vcc and the other end thereof is connected to the fifth communication line 35.

Bus communication system of a reference example

In the multi-slave configuration, when an open circuit fault occurs in a signal line shared by a plurality of devices, a fault portion can be easily identified by determining which of the plurality of devices can perform normal communication and which of the plurality of devices cannot perform normal communication. However, when a short circuit fault occurs in a signal line shared by a plurality of devices, it becomes difficult to perform normal communication between all of the devices regardless of a fault portion; therefore, it becomes difficult to identify the fault portion.

Figure 2:
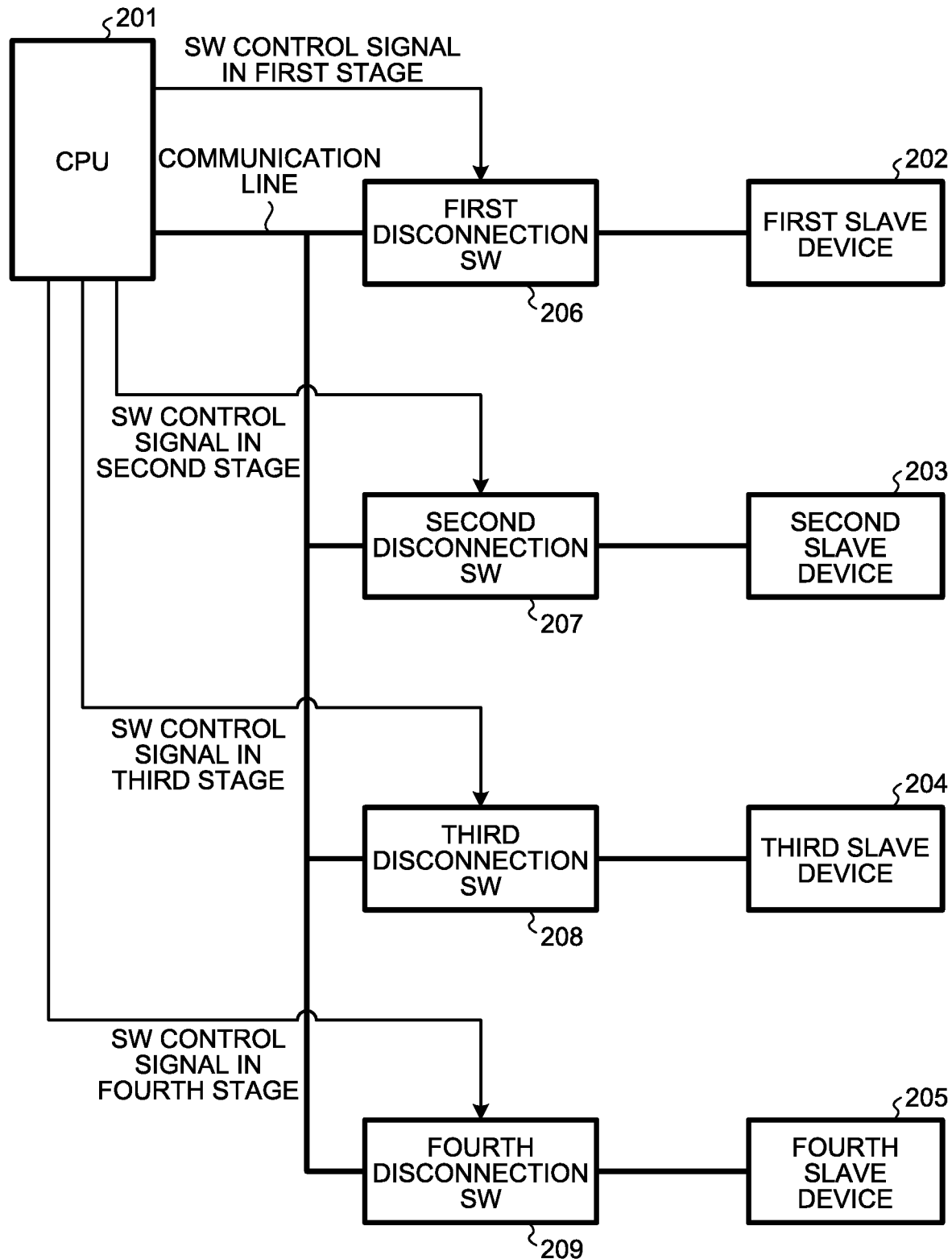
FIG. 2 is a block diagram of a bus communication system as a reference example.

FIG. 2 illustrates a bus communication system capable of detecting a short circuit fault in a signal line according to a reference example. A CPU 201 and a first slave device 202 to a fourth slave device 205 are connected in parallel to form the bus communication system according to the reference example. Furthermore, a first disconnection SW 206 to a fourth disconnection SW 209 are interposed and connected between the CPU 201 and the first slave device 202 to the fourth slave device 205, respectively to form the bus communication system according to the reference example.

The CPU 201, upon detecting that a short circuit fault occurs in a communication line connecting the CPU 201 and each of the slave devices 202 to 205, turns off the disconnection SWs 206 to 209 one by one (turns on the disconnection SWs other than the disconnection SW to be turned off), and checks whether the short circuit fault is resolved in each case.

For example, if the short circuit fault is resolved when the second disconnection SW 207 is turned off (the first disconnection SW 206, the third disconnection SW 208, and the fourth disconnection SW 209 are turned on), the CPU 201 identifies either a communication line connecting the second disconnection SW 207 and the second slave device 203 or the second slave device 203 as a short circuit fault portion. Furthermore, if the short circuit fault is not resolved even when all of the first disconnection SW 206 to the fourth disconnection SW 209 are turned off, the CPU 201 identifies a communication line connecting the CPU 201 and the first disconnection SW 206 as a short circuit fault portion.

However, in the method of detecting a short circuit fault portion according to the reference example as described above, it is necessary to provide the same number of switch control signals as the number of the slave devices (i.e., the number of the disconnection switches). Therefore, it is necessary to prepare a master device having a large number of ports or prepare a plurality of master devices as the master device for mounting the CPU 201; consequently, a system configuration cost increases. Furthermore, it requires a master device having a large number of ports, and thus it is difficult to add disconnection SWs to a master device having a small number of extra ports to construct the system.

Operation of Detecting a Short Circuit Fault Portion According to the Embodiment Next, an operation of detecting a short circuit fault portion in the bus communication system according to the embodiment will be described.

Operation During Normal Communication

First, a system operation during normal communication in which a short circuit fault does not occur in the bus communication system will be described. When normal communication is performed, the CPU 1 outputs a SW control signal at a low level (L) as illustrated in FIG. 1. The SW control signal at the low level is supplied to the first disconnection SW 6 and the first AND gate 10.

Theoretically speaking, when any of inputs is at a low level, an output from the AND gate is at a low level. Therefore, an output at the low level is supplied from the first AND gate 10 to the second disconnection SW 7 and the second AND gate 11. Furthermore, because the output at the low level is supplied from the first AND gate 10 to the second AND gate 11, an output from the second AND gate 11 is also at a low level. Moreover, the output at the low level is supplied from the second AND gate 11 to the third disconnection SW 8 and the third AND gate 12. Therefore, an output from the third AND gate 12 is also at a low level. The output at the low level is supplied from the third AND gate 12 to the fourth disconnection SW 9.

As described above, during the normal communication, the CPU 1 simply supplies the SW control signal at the low level to the first disconnection SW 6 so that all of the outputs from the AND gates 10 to 12 become the low level, and the SW control signals at the low level are supplied to the second to the fourth disconnection SWs 7 to 9. That is, while the CPU 1 outputs the SW control signal using a single signal line, it is possible to supply signals at the low level to all of the disconnection SWs 6 to 9 connected to the CPU 1.

Each of the disconnection SWs 6 to 9 has the same logic as a positive channel metal oxide semiconductor (PMOS). Therefore, each of the disconnection SWs 6 to 9 to which the low level is supplied is turned on, and normal communication can be performed.

Operation of Detecting a Short Circuit Fault That Occurs in the Second Stage

Figure 3:
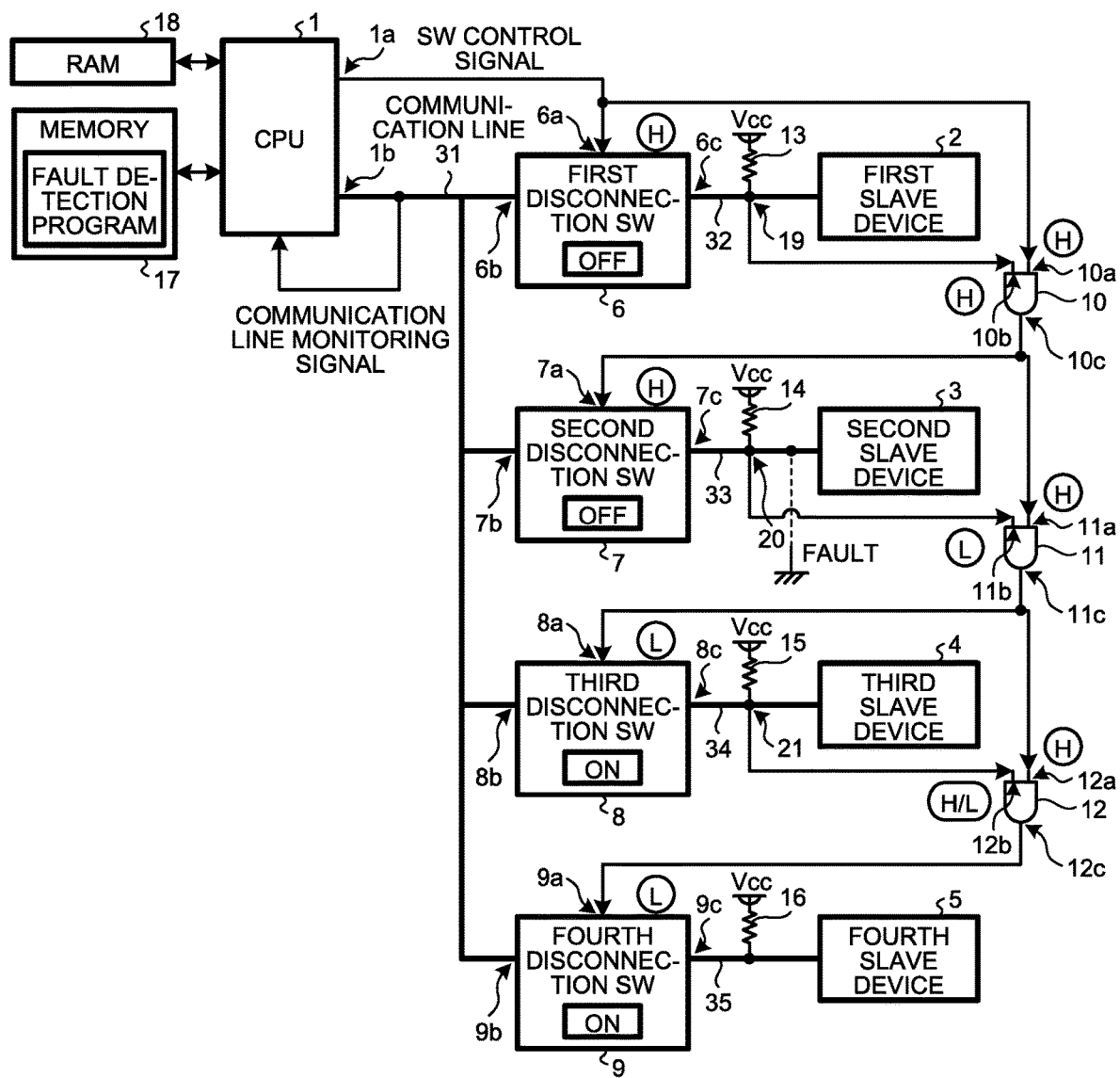
FIG. 3 is a diagram for explaining an operation of detecting a ground short circuit portion in the bus communication system according to the embodiment.

FIG. 3 illustrates an example of detection of a short circuit fault that occurs in the third communication line 33 connecting the second slave device 3 and the second disconnection SW 7 that correspond to a second stage. Upon detecting a communication abnormality and further detecting occurrence of ground short circuit based on a communication line monitoring signal, the CPU 1 supplies a SW control signal at a high level to the first disconnection SW 6 in the first stage. When the SW control signal at the high level is supplied, the first disconnection SW 6 is turned off and communication between the CPU 1 and the first slave device 2 is disconnected.

Here, even when the communication between the CPU 1 and the first slave device 2 is disconnected, the pull-up register 13 functions and the logic level of the other input terminal 10b of the first AND gate 10 is maintained at the high level. Therefore, with the two inputs at the high level, the first AND gate 10 supplies an output at a high level. The output at the high level is supplied to the second disconnection SW 7 and the second AND gate 11 that correspond to the second stage.

The second disconnection SW 7 is turned off when the output at the high level is supplied. If the second disconnection SW 7 is turned off, it is expected that the pull-up register 14 functions and the logic level of the other input terminal 11b of the second AND gate 11 is maintained at the high level as described above.

However, in the example in FIG. 3, a ground short circuit fault occurs in the third communication line 33 connecting the second slave device 3 and the second disconnection SW 7. Therefore, the logic level of the other input terminal 11b of the second AND gate 11 is not maintained at the high level but is changed to the low level (the constant-voltage source Vcc is grounded and reaches the low level) even when the pull-up register 14 is provided. If a signal at a low level is supplied to the second AND gate 11, a signal at the low level is supplied to each of the third disconnection SW 8 and the fourth disconnection SW 9, and each of the third disconnection SW 8 and the fourth disconnection SW 9 is turned off.

That is, when the CPU 1 outputs the SW control signal at the high level, the disconnection SWs in the stages in which the short circuit fault does not occur are turned off and the AND gates output signals at the high level. However, with the stage in which the short circuit fault does not occur, as the boundary, the disconnection SWs are turned on and the AND gates output signals at the low level. Therefore, after outputting the SW control signal at the high level, the CPU 1 performs communication with all of the slave devices 2 to 5 and distinguishes the slave devices that do not return responses. Then, the CPU 1 detects, as a portion in which the short circuit fault occurs, the last stage among the stages including the slave devices that do not return responses.

That is, in the example in FIG. 3, when the CPU 1 performs communication, the first and the second slave devices 2 and 3 do not return responses, but the third and the fourth slave devices 4 and 5 return responses. Therefore, the CPU 1 detects, as a ground short circuit fault portion, either the third communication line 33 corresponding to the second slave device 3 or the second slave device 3 in the last stage (to which a signal is supplied electrically later) among the first and the second slave devices 2 and 3 that do not return responses.

Operation of Detecting a Short Circuit Fault That Occurs in the Fourth Stage (Last Stage)

Figure 4:
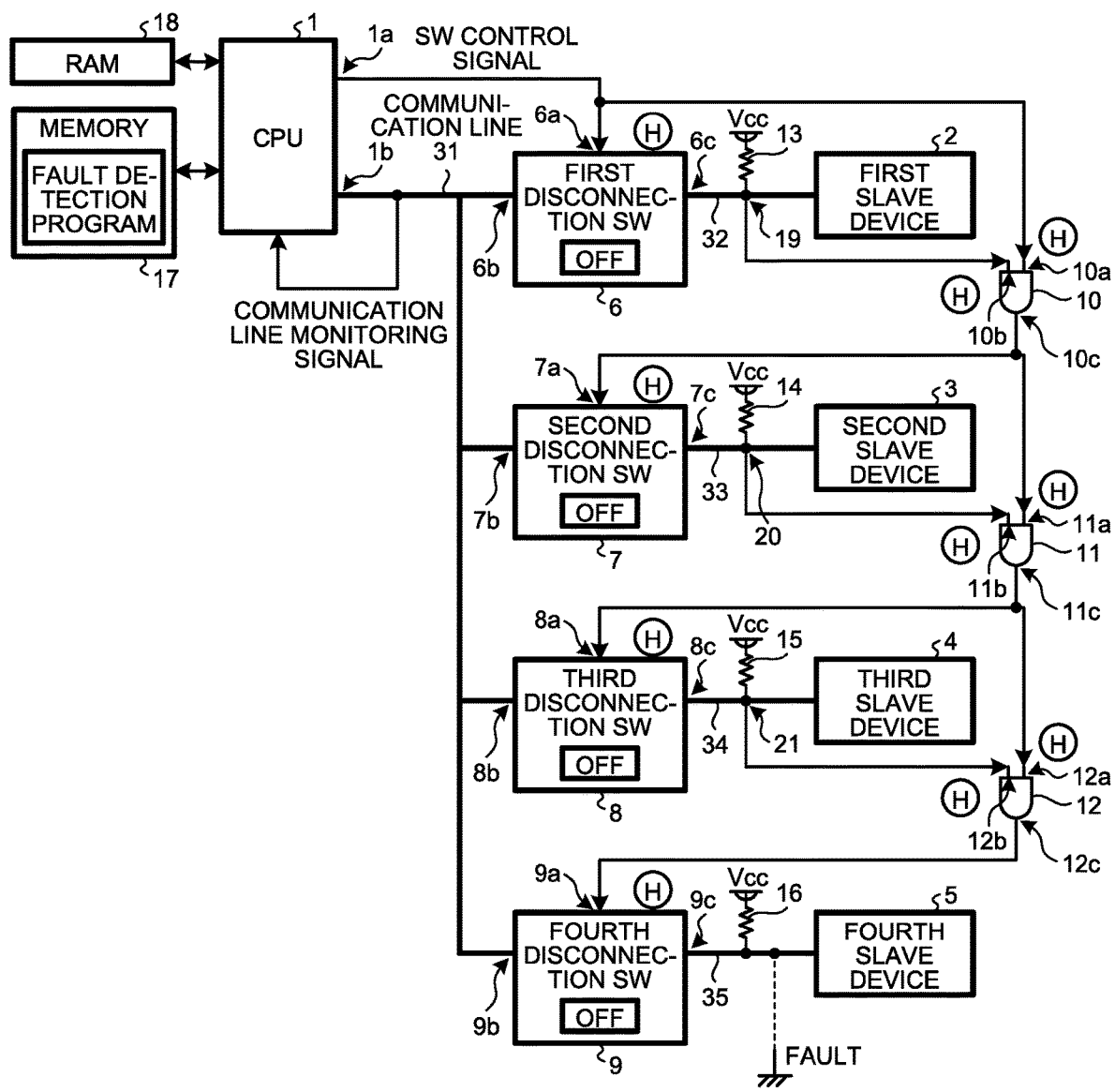
FIG. 4 is a diagram for explaining an operation of detecting another ground short circuit portion in the bus communication system according to the embodiment.

FIG. 4 illustrates an example of detection of a short circuit fault that occurs in the fifth communication line 35 connecting the fourth slave device 5 and the fourth disconnection SW 9 that correspond to the fourth stage serving as the last stage. Upon detecting a communication abnormality and further detecting occurrence of ground short circuit based on a communication line monitoring signal, the CPU 1 supplies a SW control signal at a high level to the first disconnection SW 6 in the first stage, similarly to the above. In the example illustrated in FIG. 4, a ground short circuit fault occurs in the fifth communication line 35 in the fourth stage. Therefore, if the SW control signal is set to the high level, all of outputs from the first to the third AND gates 10 to 12 are set to the high level, so that all of the first to the fourth disconnection SWs 6 to 9 are turned off.

Here, an example is described in which the ground short circuit fault occurs in the fifth communication line 35 in the fourth stage corresponding to the final stage; however, even when a ground short circuit fault occurs in the first communication line 31 connecting the CPU 1 and the first disconnection SW 6 while all of the second communication line 32 to the fifth communication line 35 are normal, signals at the high level are supplied to all of the disconnection SWs 6 to 9, so that all of the disconnection SWs 6 to 9 are turned off.

That is, both "when a ground short circuit fault occurs in the first communication line 31" and "when a ground short circuit fault occurs in the fifth communication line 35", all of the disconnection SWs 6 to 9 are turned off. Therefore, in each case, even when the CPU 1 performs communication with each of the slave devices 2 to 5, each of the slave devices 2 to 5 does not return a response.

When a ground short circuit fault occurs in the fifth communication line 35, if the fourth disconnection switch 9 is turned off, the fault portion is electrically isolated, so that the ground short circuit is resolved. In contrast, when a ground short circuit fault occurs in the first communication line 31, even if all of the disconnection switches 6 to 9 are turned off, the ground short circuit fault portion remains in a loop of the electrical circuit, so that the ground short circuit fault remains unresolved.

Therefore, the CPU 1 performs communication with each of the slave devices 2 to 5 after outputting the SW control signal at the high level, and if all of the slave devices 2 to 5 do not return responses, the CPU 1 checks again whether a ground short circuit fault occurs in the first communication line 31 based on the communication line monitoring signal (reconfirmation (recheck) of a fault).

If the ground short circuit fault is detected in the first communication line 31 based on the communication line monitoring signal, the CPU 1 identifies the first communication line 31 as a ground short circuit fault portion. In contrast, if the ground short circuit fault is not detected in the first communication line 31 based on the communication line monitoring signal, it is indicated that the ground short circuit fault occurs on the fifth communication line 35 side. Therefore, when the CPU 1 performs communication with each of the slave devices 2 to 5 after outputting the SW control signal at the high level, if all of the slave devices 2 to 5 do not return responses and if it is determined that the ground short circuit fault does not occur in the first communication line 31 through the reconfirmation (recheck) of a fault as described above, the CPU 1 detects the fifth communication line 35, which is the last stage in this example, as a ground short circuit fault portion (identifies the fault portion using the elimination method).

Modification

In the example in FIG. 4, the CPU 1 acquires the communication line monitoring signal from the first communication line 31. However, it may be possible to feed back the communication line monitoring signal to the CPU 1 from the fifth communication line 35. In this case, when the CPU 1 performs communication with each of the slave devices 2 to 5 after outputting the SW control signal at the high level, if all of the slave devices 2 to 5 do not return responses and if a ground short circuit fault has detected in the fifth communication line 35 based on the communication line monitoring signal received from the fifth communication line 35, the CPU 1 identifies the fifth communication line 35 as a ground short circuit fault portion. In contrast, if a ground short circuit fault is not detected in the fifth communication line 35 based on the communication line monitoring signal received from the fifth communication line 35, the CPU 1 identifies the fifth communication line 35 as a ground short circuit fault portion.

Example of Detection of a Ground Short Circuit Fault Portion

FIG. 5 illustrates a summary of examples of detection of a ground short circuit fault portion by the CPU 1. As illustrated in FIG. 5, when the CPU 1 rechecks the first communication line 31 and detects a ground short circuit fault in the first communication line 31 as described above, it becomes inevitably difficult to perform communication with each of the slave devices 2 to 5. Therefore, in this case, the CPU 1 detects the first communication line 31 as a ground short circuit fault portion.

Furthermore, when the CPU 1 detects a communication abnormality and further detects occurrence of ground short circuit based on a communication line monitoring signal, and if the ground short circuit is resolved by supplying a SW control signal at a high level to the first disconnection SW 6 in the first stage, the CPU 1 performs communication with each of the slave devices 2 to 5. Then, if the first slave device 2 does not return a response to the communication but the second to the fourth slave devices 3 to 5 return responses, the CPU 1 detects, as a ground short circuit fault portion, the second communication line 32 or the first slave device 2 corresponding to the last stage among the stages in which the slave devices that do not return responses are provided.

Similarly, when the CPU 1 detects a communication abnormality and further detects occurrence of ground short circuit based on a communication line monitoring signal, and if the ground short circuit is resolved by supplying a SW control signal at a high level to the first disconnection SW 6 in the first stage, the CPU 1 performs communication with each of the slave devices 2 to 5. Then, if the first and the second slave devices 2 and 3 do not return responses to the communication but the third and the fourth slave devices 4 and 5 return responses, the CPU 1 detects, as a ground short circuit fault portion, the third communication line 33 or the second slave device 3 corresponding to the last stage among the stages in which the slave devices that do not return responses are provided.

Similarly, when the CPU 1 detects a communication abnormality and further detects occurrence of ground short circuit based on a communication line monitoring signal, and if the ground short circuit is resolved by supplying a SW control signal at a high level to the first disconnection SW 6 in the first stage, the CPU 1 performs communication with each of the slave devices 2 to 5. Then, if the first to the third slave devices 2 to 4 do not return responses to the communication but the fourth slave device 5 returns a response, the CPU 1 detects, as a ground short circuit fault portion, the fourth communication line 34 or the third slave device 4 corresponding to the last stage among the stages in which the slave devices that do not return responses are provided.

Furthermore, when the CPU 1 detects a communication abnormality and further detects occurrence of ground short circuit based on a communication line monitoring signal, and if the ground short circuit is resolved by supplying a SW control signal at a high level to the first disconnection SW 6 in the first stage, the CPU 1 performs communication with each of the slave devices 2 to 5. Then, if all of the slave devices 2 to 5 do not return responses to the communication, the CPU 1 detects, as a ground short circuit fault portion, the fifth communication line 35 or the fourth slave device 5 corresponding to the last stage among the stages in which the slave devices that do not return responses are provided.

Operation of Detecting a Ground Short Circuit Portion Using a Fault Detection Program The CPU 1 performs operations based on the fault detection program stored in the memory 17 illustrated in FIG. 1 to perform an operation of detecting a ground short circuit portion. Specifically, the CPU 1 reads the fault detection program and loads each of functions programmed in the fault detection program onto the RAM 18. Then, the CPU 1 implements each of the functions loaded on the RAM 18 to detect a ground short circuit portion as described above.

Figure 6:
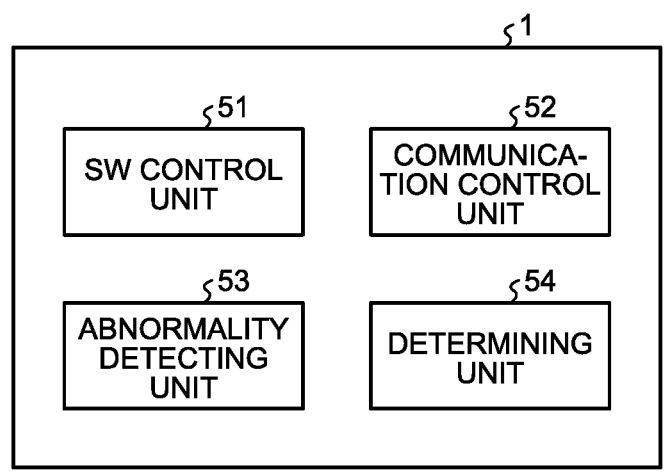
FIG. 6 is a functional block diagram of functions that are implemented by causing a CPU of the bus communication system to execute a ground short circuit portion detection program according to the embodiment.

FIG. 6 is a functional block diagram of each of the functions implemented by causing the CPU 1 to execute the fault detection program. As illustrated in FIG. 6, the CPU 1 executes the fault detection program and functions as a SW control unit 51, a communication control unit 52, an abnormality detecting unit 53, and a determining unit 54. While it is assumed that the SW control unit 51 to the determining unit 54 are implemented by software using the fault detection program, a part or all of the units may be implemented by hardware, such as an integrated circuit (IC).

The fault detection program may be recorded in a computer-readable recording medium, such as a compact disc read only memory (CD-ROM) or a flexible disk (FD), in a computer-installable or computer-executable file format, and then distributed. Furthermore, the fault detection program may be recorded in a computer-readable recording medium, such as a compact disc recordable (CD-R), a digital versatile disk (DVD), a Blu-ray (registered trademark) disk, or a semiconductor memory, and then distributed. Moreover, the fault detection program may be provided by installation via a network, such as the Internet. Furthermore, the fault detection program may be provided by incorporation in a ROM or the like in an apparatus.

FIG. 7 is a flowchart illustrating the flow of an operation of detecting a ground short circuit portion based on the fault detection program. First, at Step S1, the SW control unit 51 outputs a SW control signal at a low level. Then, at Step S2, the communication control unit 52 performs communication with each of the slave devices 2 to 5. If communication paths are normal, it is expected that each of the disconnection SWs 6 to 9 is turned on using the SW control signal at the low level and normal communication is performed with each of the slave devices 2 to 5. At Step S3, the abnormality detecting unit 53 determines whether normal communication is performed with each of the slave devices 2 to 5.

If the abnormality detecting unit 53 detects an abnormality in the communication with each of the slave devices 2 to 5 (YES at Step S3), the communication control unit 52 outputs a signal at a high level to the first communication line 31 at Step S4. Then, at Step S5, the abnormality detecting unit 53 determines whether a signal that is returned as a communication line monitoring signal is at a high level, and determines whether the abnormality occurs in the first communication line 31. If a communication abnormality is detected even when the signal at the high level normally flows in the first communication line 31 (YES at Step S5), it is suspected that an open circuit fault occurs. Therefore, at Step S15, the abnormality detecting unit 53 performs a predetermined notification operation, such as displaying of a message indicating a need to detect a fault portion using another method on a monitor device, and the process in the flowchart in FIG. 7 ends.

In contrast, if the communication abnormality is detected, and if an abnormality is detected in the first communication line 31 because a communication line monitoring signal at a low level is detected despite the fact that the signal at the high level is provided in the first communication line 31 (NO at Step S5), the SW control unit 51 outputs a SW control signal at a high level at Step S6. Then, at Step S7, the abnormality detecting unit 53 determines whether a communication line monitoring signal is normal (high level). If the abnormality detecting unit 53 detects the communication line monitoring signal at the low level (NO at Step S7), the determining unit 54 determines, at Step S16, that the first communication line 31 is a fault portion in which the ground short circuit occurs, and the process in the flowchart in FIG. 7 ends.

In contrast, if it is determined that the communication line monitoring signal is normal (high level) (YES at Step S7), the communication control unit 52 requests the second slave device 3 to return a response at Step S8. Then, at Step S9, the communication control unit 52 determines presence or absence of a response from the second slave device 3. If the communication control unit 52 detects a response from the second slave device 3 (YES at Step S9), it is indicated that the abnormality is present in the first stage. Therefore, at Step S17, the determining unit 54 determines that the second communication line 32 or the first slave device 2 corresponding to the first stage is the fault portion, and the process in the flowchart in FIG. 7 ends.

If the second slave device 3 does not return a response after the request for the response is issued to the second slave device 3 (NO at Step S9), the communication control unit 52 requests the third slave device 4 to return a response at Step S10. Then, at Step S11, the communication control unit 52 determines presence or absence of a response from the third slave device 4. If the communication control unit 52 detects a response from the third slave device 4 (YES at Step S11), it is indicated that the abnormality is present in the second stage. Therefore, at Step S18, the determining unit 54 determines that the third communication line 33 or the second slave device 3 corresponding to the second stage is the fault portion, and the process in the flowchart in FIG. 7 ends.

If the third slave device 4 does not return a response after the request for the response is issued to the third slave device 4 (NO at Step S11), the communication control unit 52 requests the fourth slave device 5 to return a response at Step S12. Then, at Step S13, the communication control unit 52 determines presence or absence of a response from the fourth slave device 5. If the communication control unit 52 detects a response from the fourth slave device 5 (YES at Step S13), it is indicated that the abnormality is present in the third stage. Therefore, at Step S19, the determining unit 54 determines that the fourth communication line 34 or the third slave device 4 corresponding to the third stage is the fault portion, and the process in the flowchart in FIG. 7 ends.

In contrast, if the communication control unit 52 does not detect a response from the fourth slave device 5 (NO at Step S13), it is indicated that the abnormality is present in the fourth stage that is the last stage in this example. Therefore, at Step S14, the determining unit 54 determines that the fifth communication line 35 or the fourth slave device 5 corresponding to the fourth stage is the fault portion, and the process in the flowchart in FIG. 7 ends.

Effects of the Embodiment

As can be seen in the description above, the bus communication system according to the embodiment connects the CPU 1 and each of the slave devices 2 to 5. Furthermore, the disconnection SWs 6 to 9 are interposed and connected between the respective slave devices 2 to 5 and the CPU 1. Then, each of the disconnection SWs 6 to 9 is turned on or off using a logic that is determined based on occurrence or nonoccurrence of ground short circuit in each of the slave devices 2 to 5 in the preceding stage. With this configuration, the CPU 1 simply outputs a SW control signal for the disconnection SW 6 in the first stage so that the disconnection SWs 7 to 9 in the subsequent stages are turned on and off based on occurrence or nonoccurrence of the ground short circuit. The ON/OFF state of each of the disconnection SWs 6 to 9 and which of the slave devices 2 to 5 can perform normal communication are changed depending on a portion in which the ground short circuit occurs. Therefore, by detecting the ON/OFF state of each of the disconnection SWs 6 to 9 and which of the slave devices 2 to 5 can perform normal communication, it is possible to identify a portion in which the ground short circuit occurs.

Furthermore, with use of the single CPU 1 and a single communication line for a SW control signal, it is possible to control ON and OFF of the disconnection SWs 6 to 9 in all of the stages and identify a portion in which ground short circuit occurs. Therefore, it is possible to perform the identification with a simple structure. For example, it is possible to prevent restriction on configurations, such as a circuit design, a mounting area, or a mounting location, around the CPU.

According to an embodiment of the present invention, it is possible to detect, with a simple structure, a portion in which ground short circuit occurs in a bus communication system with a multi-slave configuration.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A ground short circuit portion detecting apparatus of a bus communication system in which a master device and a plurality of slave devices in a plurality of stages are connected, the ground short circuit portion detecting apparatus comprising:
 a plurality of switch units each arranged between the master device and a slave device in a stage, and configured to control ON and OFF of communication between the master device and the slave device;
 a plurality of level maintaining units each arranged between a switch unit and a slave device, and configured to maintain a signal level of a communication line between the switch unit and the slave device at a predetermined level; and
 a plurality of generating units each arranged in a stage, and configured to generate a switch control signal for turning on and off a switch unit in the stage, wherein
 a switch unit in a first stage is turned on and off by a switch control signal output from the master device,
 a switch unit in a second stage is turned on and off by a switch control signal generated by a generating unit in the second stage based on a level of a signal output from a level maintaining unit in the first stage and a level of the switch control signal output from the master device,
 a switch unit in each of third and subsequent stages is turned on and off by a switch control signal generated by a generating unit in a preceding stage based on a level of a signal output from a level maintaining unit in a preceding stage and a level of a switch control signal generated by a generating unit in a second preceding stage, and
 the master device is configured to identify a portion in which ground short circuit occurs, based on states of communication with the plurality of slave devices, the states of communication being changed depending on at least ON/OFF states of the plurality of switch units.

2. The ground short circuit portion detecting apparatus according to claim 1, wherein the master device is configured to identify, as the portion in which the ground short circuit occurs, a last stage among stages in each of which a state of communication with a slave device indicates no response.

3. The ground short circuit portion detecting apparatus according to claim 1, wherein the master device is configured to:
in a case where states of communication with all of the plurality of slave devices indicate no response, detect whether the ground short circuit occurs in a communication line connecting the master device and the switch unit in the first stage; and
in a case where the master device detects the ground short circuit in the communication line, identify the communication line as the portion in which the ground short circuit occurs, and in a case where the master device does not detect the ground short circuit in the communication line, identify a last stage as the portion in which the ground short circuit occurs.

4. The ground short circuit portion detecting apparatus according to claim 1, wherein
each of the plurality of level maintaining units is a pull-up register configured to maintain a signal level in a corresponding communication line among communication lines between the plurality of switch units and the plurality of slave devices, at a high level, and
each of the plurality of generating units is an AND gate configured to:
generate a switch control signal to turn on a switch unit in a case where at least one of a level of a signal output from the level maintaining unit in the first stage and a level of the switch control signal output from the master device is at a low level or in a case where at least one of a level of a signal output from a level maintaining unit in a preceding stage and a level of a switch control signal generated by a generating unit in a second preceding stage is at the low level; and
generate a switch control signal to turn off a switch unit in a case where both of the level of the signal output from the level maintaining unit in the first stage and the level of the switch control signal output from the master device are at the high level or in a case where both of the level of the signal output from the level maintaining unit in the preceding stage and the level of the switch control signal generated by the generating unit in the second preceding stage are at the high level.

5. A ground short circuit portion detecting method in a bus communication system in which a master device and a plurality of slave devices in a plurality of stages are connected, the ground short circuit portion detecting method comprising:
providing a plurality of switch units such that the plurality of switch units are each arranged between the master device and a slave device in a stage, and configured to control ON and OFF of communication between the master device and the slave device;
providing a plurality of level maintaining units such that the plurality of level maintaining units are each arranged between a switch unit and a slave device, and configured to maintain a signal level of a communication line between the switch unit and the slave device at a predetermined level;
providing a plurality of generating units such that the plurality of generating units are each arranged in a stage, and configured to generate a switch control signal for turning on and off a switch unit in the stage;
turning on and off a switch unit in a first stage by a switch control signal output from the master device;
turning on and off a switch unit in a second stage by a switch control signal generated by a generating unit in the second stage based on a level of a signal output from a level maintaining unit in the first stage and a level of the switch control signal output from the master device;
turning on and off a switch unit in each of third and subsequent stages by a switch control signal generated by a generating unit in a preceding stage based on a level of a signal output from a level maintaining unit in a preceding stage and a level of a switch control signal generated by a generating unit in a second preceding stage; and
causing the master device to identify a portion in which ground short circuit occurs, based on states of communication with the plurality of slave devices, the states of communication being changed depending on at least ON/OFF states of the plurality of switch units.

6. A non-transitory computer-readable recording medium containing a ground short circuit portion detection program in a bus communication system in which a master device and a plurality of slave devices in a plurality of stages are connected, the bus communication system includes:
a plurality of switch units each arranged between the master device and a slave device in a stage, and configured to control ON and OFF of communication between the master device and the slave device;
a plurality of level maintaining units each arranged between a switch unit and a slave device, and configured to maintain a signal level of a communication line between the switch unit and the slave device at a predetermined level; and
a plurality of generating units each arranged in a stage, and configured to generate a switch control signal for turning on and off a switch unit in the stage, wherein
the ground short circuit portion detection program causes a computer to function as:
a switch control unit configured to:
turn on and off a switch unit in a first stage by a switch control signal output from the master device;
turn on and off a switch unit in a second stage by a switch control signal generated by a generating unit in the second stage based on a level of a signal output from a level maintaining unit in the first stage and a level of the switch control signal output from the master device; and
turn on and off a switch unit in each of third and subsequent stages by a switch control signal generated by a generating unit in a preceding stage based on a level of a signal output from a level maintaining unit in a preceding stage and a level of a switch control signal generated by a generating unit in a second preceding stage; and
a determining unit configured to identify a portion in which ground short circuit occurs, based on states of communication with the plurality of slave devices, the states of communication being changed depending on at least ON/OFF states of the plurality of switch units.

* * * * *